United States Patent
Ryon et al.

(10) Patent No.: US 10,182,065 B1
(45) Date of Patent: Jan. 15, 2019

(54) DISTRIBUTED VETRONICS INTRUSTION DETECTION SYSTEM AND DEVICE

(71) Applicant: Rockwell Collins, Inc., Cedar Rapids, IA (US)

(72) Inventors: Luke E. Ryon, Cedar Rapids, IA (US); Carl J. Riechers, Lisbon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 275 days.

(21) Appl. No.: 15/196,730

(22) Filed: Jun. 29, 2016

(51) Int. Cl.
G06F 21/00 (2013.01)
H04L 29/06 (2006.01)
H04L 29/08 (2006.01)

(52) U.S. Cl.
CPC ...... H04L 63/1425 (2013.01); H04L 63/1408 (2013.01); H04L 63/1441 (2013.01); H04L 67/12 (2013.01)

(58) Field of Classification Search
CPC .................. H04L 63/1408; H04L 63/1425
USPC .................................................... 726/22–25
See application file for complete search history.

(56) References Cited

U.S. PATENT DOCUMENTS

| | | |
|---|---|---|
| 7,581,002 B2 | 8/2009 | Royalty |
| 9,369,484 B1 | 6/2016 | Lacerte et al. |
| 2003/0065409 A1 | 4/2003 | Raeth et al. |
| 2007/0087756 A1* | 4/2007 | Hoffberg ............ G06Q 10/0631 455/450 |
| 2011/0219035 A1 | 9/2011 | Korsunsky et al. |
| 2012/0232679 A1 | 9/2012 | Abercrombie et al. |
| 2013/0268994 A1 | 10/2013 | Cooper et al. |
| 2013/0318615 A1 | 11/2013 | Christodorescu et al. |
| 2013/0318616 A1 | 11/2013 | Christodorescu et al. |
| 2014/0380433 A1* | 12/2014 | Yerger .................. H04L 63/107 726/4 |

* cited by examiner

*Primary Examiner* — Anthony D Brown
(74) *Attorney, Agent, or Firm* — Angel N. Gerdzhikov; Donna P. Suchy; Daniel M. Barbieri

(57) ABSTRACT

A computing device may include a non-transitory computer-readable medium and a processor communicatively coupled to the non-transitory computer-readable medium. The processor may be configured to receive, from a vetronics computing device including a processor, data associated with messages received by the vetronics computing device, the messages having been determined to include aberrant data. Based at least on the received data, the processor may be configured to determine an occurrence of a cyber security threat. The processor may be configured to output cyber security threat data associated with the determined occurrence of the cyber security threat.

22 Claims, 8 Drawing Sheets

DISTRIBUTED VETRONICS INTRUSTION DETECTION SYSTEM AND DEVICE

CROSS-REFERENCE TO RELATED APPLICATIONS

The present application is related to U.S. patent application Ser. No. 14/340,010, filed on Jul. 24, 2014, which issued as U.S. Pat. No. 9,369,484 on Jun. 14, 2016, which is hereby expressly incorporated herein in its entirety.

BACKGROUND

Cyber security threats are becoming increasingly persuasive, and cyber attacks continue to evolve to overcome existing cyber security efforts. Existing intrusion detection systems (IDSs) fail to adequately detect and respond to many never-before-seen cyber security threats to avionics devices in operationally relevant time scales. Limitations of traditional IDSs include high computing costs, high false-positives, low detection rates, inability to detect new types of attacks, and rigid, inflexible deployments.

Operational environments typically impose severe limits on size, weight, and power (SWAP) available for vetronics devices. Additionally, with respect to safety issues related to vetronics, there are significant regulations governing the development, manufacturing, deployment, and maintenance of vetronics devices. Further, existing vetronics devices typically have limited and/or intermittent connectivity.

Traditional information technology (IT) IDSs are typically either network-based IDSs (NIDSs) or host-based IDSs (HIDSs).

Typically, an NIDS monitors a given network segment and attempts to detect intrusions that utilize such network segment. To perform such monitoring, the NIDS is configured with rules tailored to the network segment being monitored. Due to a high quantity of data typically traversing the network segment, the NIDS is typically implemented on a large, high powered, and expensive computing platform. Due to complexity of the data typically traversing the network segment, NIDS rules commonly only identify previously-known intrusion signatures; such signatures are unable to detect previously-unknown intrusion events. Due to typically limited connectivity of typical vetronics devices, the rule signatures are typically unable to be updated in a real-time manner, thus significantly increasing the time to update new signatures for recently discovered intrusions.

An HIDS is typically implemented with a separate application running on a computing device that attempts to detect intrusions by monitoring an operating system (OS) and applications running on the computing device. Due to complexity of the running applications and the OS, the rules commonly are only able to identify previously-known intrusion signatures; such signatures are typically unable to detect previously-unknown intrusion events. Similar to the NIDS, the typically limited connectivity of vetronics devices prevents rules signatures from being updated in a real-time manner, which significantly increases the time to update new signatures for recently discovered intrusions. Additionally, the HIDS typically requires significant additional system resources (e.g., processor resources, memory resources, networking bandwidth (e.g., bus bandwidth) resources, and power resources) for processing HIDS operations.

Some conventional IDSs use a separate 'guard' application that monitors all traffic going into an application. However, this separate guard application requires significant additional system resources (e.g., processor resources, memory resources, networking bandwidth (e.g., bus bandwidth) to perform the HIDS's monitoring. Additionally, the separate guard application is typically highly coupled to the corresponding monitored application such that any changes to the corresponding monitored application are also required to be made in the separate guard application; implementing changes in both the corresponding monitored application and the separate guard application increases development costs and time to market. Additionally, the separate guard application typically duplicates all of the checking and state logic of the original application, which requires availability of significant additional resources (e.g., processor resources, memory resources, networking bandwidth (e.g., bus bandwidth) resources) to perform the duplicative processing associated with the separate guard application.

SUMMARY

In one aspect, embodiments of the inventive concepts disclosed herein are directed to a computing device. The computing device may include a non-transitory computer-readable medium and a processor communicatively coupled to the non-transitory computer-readable medium. The processor may be configured to receive, from a vetronics computing device including a processor, data associated with messages received by the vetronics computing device, the messages having been determined to include aberrant data. Based at least on the received data, the processor may be configured to determine an occurrence of a cyber security threat. The processor may be configured to output cyber security threat data associated with the determined occurrence of the cyber security threat.

In a further aspect, embodiments of the inventive concepts disclosed herein are directed to a system. The system may include vetronics computing devices implemented in a vehicle and a computing device communicatively coupled to the vetronics computing devices. Each vetronics computing device may include a non-transitory computer-readable medium and a processor communicatively coupled to the non-transitory computer-readable medium. The processor may be configured to receive messages and determine that a received message includes aberrant data. In response to a determination that the received message includes the aberrant data, the processor may be further configured to output data associated with the received message determined to include the aberrant data. The computing device may include a computing device non-transitory computer-readable medium and a computing device processor communicatively coupled to the computing device non-transitory computer-readable medium. The computing device processor may be configured to receive outputted data associated with the received message determined to include the aberrant data. Based at least on the received outputted data, the computing device processor may be configured to determine an occurrence of a cyber security threat. The computing device processor may be configured to output cyber security threat data associated with the determined occurrence of the cyber security threat.

In a further aspect, embodiments of the inventive concepts disclosed herein are directed to a vetronics computing device including a memory and a processor communicatively coupled to the memory. The processor may be configured to receive a message. The processor may be configured to determine that the received message includes aberrant data. In response to a determination that the received message includes the aberrant data, the processor may be configured to output, to a computing device including a computing device processor, data associated with the received message determined to include the aberrant data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
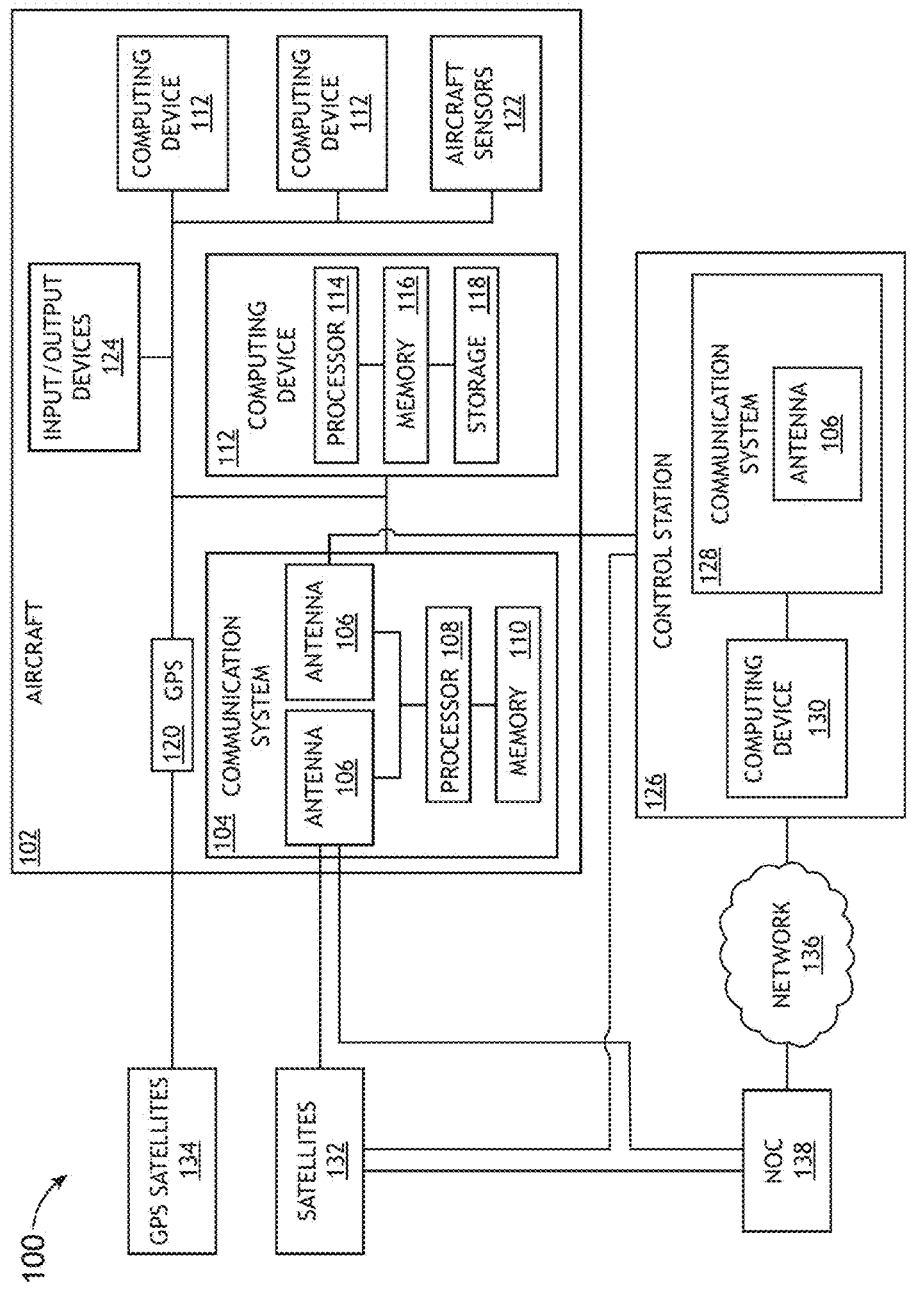
FIG. 1 is a view of an exemplary embodiment of a system including an aircraft, a control station, satellites, global positioning system (GPS) satellites, a network, and a network operations center (NOC) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method, system, and at least one device. Some embodiments may include an IDS that is distributed among multiple vehicular computing devices (e.g., vetronics computing devices) and/or other computing devices, which are communicatively coupled. Some embodiments may include augmenting (e.g., retrofitting (e.g., installing a new component) and/or reprogramming (e.g., installing a software update)) existing vetronics computing devices (e.g., avionics computing devices) such that augmented vetronics computing devices are further configured to send reports associated with messages that have aberrant data (e.g., anomalistic, abnormal, unexpected, and/or erroneous data) to a communicatively coupled IDS system computing device. The IDS system computing device may include a processor configured to execute instructions of an IDS engine (e.g., an IDS correlation engine) to analyze the reports from the augmented vetronics computing devices to determine whether a cyber security threat exists.

In one embodiment, a distributed IDS may include a first computing device and avionics computing devices implemented in an aircraft. Each of the avionics computing devices may be configured to receive messages, such as from any of various aircraft sensors, onboard computing devices, and/or off-board computing devices. Each of the avionics computing devices may be configured to determine that a particular received message includes aberrant data (e.g., anomalistic, abnormal, unexpected, and/or erroneous data). In response to a determination that the particular received message includes the aberrant data, each of the avionics computing devices may be configured to output a cyber security report, to the first computing device, associated with the particular received messages determined to include the aberrant data.

The first computing device may include a memory and a processor. The first computing device may be configured to receive, from each of the avionics computing devices, the cyber security report associated with the one or more received messages determined to include the aberrant data. Based at least on the received cyber security report, the first computing device may be configured to determine an occurrence of a cyber security threat at least with respect to one or more of the avionics computing devices. Additionally, the first computing device may be configured to output cyber security threat data associated with the determined occurrence of the cyber security threat, for example, to another computing device or output device. The first computing device may be configured to monitor the cyber security reports from the avionics computing devices in real time and maintain a data structure of data obtained from the cyber security reports. The computing device may be configured to utilize the data structure to analyze cyber security reports in substantially real time so as to improve the sensitivity with which cyber security threats may be detected.

Further, embodiments may be configured to improve the functioning of vetronics computing devices (e.g., avionics computing devices), themselves, by enhancing intrusion detection while reducing (e.g., minimizing) IDS processing requirements and reducing (e.g., minimizing) cost. Additionally, each vetronics computing device (e.g., avionics computing device) of a distributed IDS may be implemented with custom (e.g., custom programmed) detection coverage tailored to the particular vetronics computing device's associated sensors. Embodiments may be configured to improve the functioning of vetronics computing devices, themselves, by reducing intrusion false positives. Embodiments may be configured to improve the functioning of vetronics computing devices, themselves, by distributing computing load required for the distributed IDS over existing networked vetronics computing devices such that each vetronics computing device only has minimal increased computing requirements, which reduces the likelihood that that existing vetronics computing devices need to be replaced, thus increasing the expected useful life of existing vetronics computing devices. Further, a distributed IDS may be deployed (e.g., installed) iteratively (e.g., one or more vetronics computing devices at a time) such that not all vetronics computing devices need to be upgraded at the same time.

Referring now to FIG. 1, an exemplary embodiment of a system 100 according to the inventive concepts disclosed herein includes at least one aircraft 102, a control station 126, satellites 132, global positioning system (GPS) satellites 134, a network 136, and a network operations center (NOC) 138. Some or all of the aircraft 102, the control station 126, the satellites 132, the GPS satellites 134, the network 136, and the NOC 138 may be communicatively coupled at any given time.

The aircraft 102 includes at least one communication system 104, a plurality of computing devices 112 (which may also be referred to as aircraft computing devices, helicopter computing devices, or vehicular computing devices as may be appropriate), a GPS device 120, aircraft sensors 122, and input/output devices 124, as well as other systems, equipment, and devices commonly included in aircraft. Some or all of the communication system 104, the computing devices 112, the GPS device 120, the aircraft sensors 122, the input/output devices 124, and any other systems, equipment, and devices commonly included in the aircraft 102 may be communicatively coupled. While not shown, in some embodiments, the aircraft 102 may optionally include a NOC or include components (e.g., at least one computing device 112 and/or the communication system 104) configured to perform functionality similar to the NOC 138. The aircraft 102 may be implemented as any suitable aircraft, such as a helicopter or airplane. While the system 100 is exemplarily shown as including the aircraft 102, in some embodiments the inventive concepts disclosed herein may be implemented in or on vetronics computing devices of any suitable vehicle (e.g., an automobile, train, submersible craft, watercraft, or spacecraft) or in any suitable environment.

The communication system 104 includes one or more antennas 106 (e.g., two antennas 106, as shown), a processor 108, and memory 110, which are communicatively coupled. The communication system 104 (such as via one or more of the antennas 106) is configured to send and/or receive signals, data, messages, and/or voice transmissions to and/or from the control station 126, other vehicles, the satellites 132, the NOC 138, and combinations thereof, as well as any other suitable devices, equipment, or systems. That is, the communication system 104 is configured to exchange (e.g., bi-directionally exchange) signals, data, messages, and/or voice communications with any other suitable communication system (e.g., which may be implemented similarly and function similarly to the communication system 104). Additionally, for example, the communication system 104 may be configured to exchange, send, and/or receive (e.g., via a wireless connection, a cabled connection, and/or a wired connection, a passenger broadband service connection, a safety services connection, or a combination thereof) signals, data, messages, and/or voice communications with, to, and/or from any suitable onboard device(s).

The communication system 104 may include at least one processor 108 configured to run or execute various software applications, computer code, and/or instructions stored (e.g., maintained) in at least one non-transitory computer-readable medium (e.g., at least one computer-readable medium implemented as hardware; e.g., at least one non-transitory processor-readable medium, at least one memory 110 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof). Some or all of the at least one computer-readable medium may be communicatively coupled. For example, the processor 108 may be configured to receive data from the computing devices 112 and execute instructions configured to cause a particular antenna of the antennas 106 to transmit the data as a signal(s) to another communication system (e.g., 128) of the system 100. Likewise, for example, the processor 108 may be configured to route data received as a signal(s) by a particular antenna of the antennas 106 to one or more of the computing devices 112. In some embodiments, the processor 108 may be implemented as one or more radiofrequency (RF) processors.

Each of the antennas 106 may be implemented as or may include any suitable antenna or antenna device. For example, the antennas 106 may be implemented as or include at least one electronically scanned array (ESA) (e.g., at least one active ESA (AESA)), at least one radio (e.g., at least one software defined radio (SDR)), at least one transmitter, at least one receiver, at least one transceiver, or a combination thereof.

While the communication system 104 is shown as having two antennas 106, one processor 108, and memory 110, the communication system 104 may include any suitable number of antennas 106, processors 108, and memory 110. Further, the communication system 104 may include other components, such as a storage device (e.g., solid state drive or hard disk drive), radio tuners, and controllers.

Each of the computing devices 112 of the aircraft 102 may include at least one processor 114, memory 116, and storage 118, as well as other components, equipment, and/or devices commonly included in a computing device, all of which may be communicatively coupled to one another. Each of the computing devices 112 may be configured to route data to each other as well as to the communication system 104 for transmission to an off-board destination (e.g., satellites 132, NOC 138, control station 126). Likewise, each computing device 112 may be configured to receive data from another computing device 112 as well as from the communication system 104 transmitted from off-board sources (e.g., satellites 132, NOC 138, control station 126). The computing device 112 may include or may be implemented as and/or be configured to perform the functionality of any suitable aircraft system, such as an intrusion detection system (IDS) computing device (e.g., 112-1), an engine indication and crew alerting system (EICAS) computing device (e.g., 112-2), a flight management system (FMS) computing device (e.g., 112-3), an integrated flight information system (IFIS) computing device (e.g., 112-4), an information management system (IMS) computing device (e.g., 112-5), an onboard maintenance system (OMS) computing device (e.g., 112-6), and a terrain awareness and warning system (TAWS) computing device (e.g., 112-7). (See, e.g., FIG. 4.) The processor 114 may be configured to run various software applications or computer code stored (e.g., maintained) in a non-transitory computer-readable medium (e.g., memory 116 or storage 118) and configured to execute various instructions or operations. Additionally, for example, the computing devices 112 or the processors 114 may be implemented as special purpose computers or special purpose processors configured (e.g., programmed) to execute instructions for performing any or all of the operations disclosed throughout. In some embodiments, the aircraft 102 may include any suitable number of computing devices 112.

The GPS device 120 receives location data from the GPS satellites 134 and may provide vehicular location data (e.g., aircraft location data) to any of various equipment/systems of the aircraft 102 (e.g., the communication system 104, the computing devices 112, the aircraft sensors 122, and the input/output devices 124). The GPS device 120 may include a GPS receiver and a processor. For example, the GPS device 120 may receive or calculate location data from a sufficient number (e.g., at least four) of GPS satellites 134 in view of the aircraft 102 such that a GPS solution may be calculated. In some embodiments, the GPS device 120 may be implemented as or as part of a computing device 112, the communication system 104, navigation sensors of the aircraft sensors 122, and/or one of the input/output devices 124. The GPS device 120 may be configured to provide the location data to any of various equipment/systems of a vehicle. For example, the GPS device 120 may provide location data to the computing devices 112, the communication system 104, and the input/output devices 124. Further, while FIG. 1 depicts the GPS device 120 implemented in the aircraft 102, in other embodiments, the GPS device 120 may be implemented in or on any type of vehicle, such as automobiles, spacecraft, trains, watercraft, or submersible craft.

While the communication system 104, the computing devices 112, the GPS device 120, the aircraft sensors 122, and the input/output devices 124 of the aircraft 102 have been exemplarily depicted as being implemented as separate devices or systems, in some embodiments, some or all of the communication system 104, the computing devices 112, the GPS device 120, the aircraft sensors 122, and/or the input/output devices 124 may be implemented as a single integrated system or device or as any number of integrated and/or partially integrated systems and/or devices.

The control station 126 includes at least one communication system 128 and at least one computing device 130, as well as other systems, equipment, and devices commonly included in a control station. Some or all of the communication system 128, the computing device 130, and other systems, equipment, and devices commonly included in a control station may be communicatively coupled. The control station 126 may be implemented as a fixed location ground control station (e.g., a ground control station of an air traffic control tower, or a ground control station of a network operations center (e.g., 138)) located on the ground of the earth. In some embodiments, the control station 126 may be implemented as a mobile ground control station (e.g., a ground control station implemented on a non-airborne vehicle (e.g., an automobile or a ship) or a trailer). In some embodiments, the control station 126 may be implemented as an air control station implemented on an airborne vehicle (e.g., aircraft). The control station 126 may include a NOC or be communicatively coupled to the NOC 138 (e.g., via the network 136).

The communication system 128 and components thereof (such as antenna 106) of the control station 126 may be implemented similarly to the communication system 104 except that, in some embodiments, the communication system 128 may be configured for operation at a fixed location. The computing device 130 and components thereof (such as a processor (not shown) and memory (not shown)) of the control station 126 may be implemented similarly to the computing devices 112.

While the antennas 106 are exemplarily depicted as being implemented in the aircraft 102 and the control station 126, in some embodiments, antennas 106 may be implemented in, on, or coupled to any other suitable device, equipment, or system, such as a computing device (e.g., a laptop computing device, a mobile computing, a wearable computing device, or a smart phone), a mobile communication system (e.g., a man pack communication system), or satellites 132.

The network 136 may be implemented as any suitable network or combination of networks. For example, the network 136 may include or be implemented as the internet, a portion of the internet (such as a secured optical fiber network), an intranet, a wide area network (WAN), a local area network (LAN), and/or a mobile telecommunications network (e.g., a third generation (3G) network or a fourth generation (4G) network)). While the system 100 is exemplarily shown as including the network 136, the system 100 or various components of the system 100 may include or be communicatively coupled via any suitable number and any suitable types of networks.

The NOC 138 may connect a particular type of communications (e.g., satellite communications with the satellites 132 and/or aircraft communications with the aircraft 102) with the network 136. In some embodiments, the NOC 138 may be implemented as a part of a distributed intrusion detection system (IDS). For example, the NOC 138 may include a processor and memory such that the processor is configured to execute instructions of an IDS engine (e.g., an IDS correlation engine) stored (e.g., maintained) in the memory of the NOC 138. Additionally, for example, the NOC 138 may include an IDS computing device, which may be implemented similarly to and perform functionality similar to the first avionics computing device 112-1 (shown in and described with respect to FIG. 4) except that the IDS computing device of the NOC need not be certified or configured for operation in flight.

While FIG. 1 exemplarily includes elements as shown, in some embodiments, one or more of the elements of the system 100 may be omitted, or the system 100 may include other elements. For example, one or more of the GPS satellites 134, satellites 132, the control station 126, the network 136, or the NOC 138 may be optional. Additionally, while an embodiment has been depicted as including one control station (e.g., the control station 126), other embodiments may include any number of control stations of various types positioned or moving anywhere in the system 100.

Figure 2:
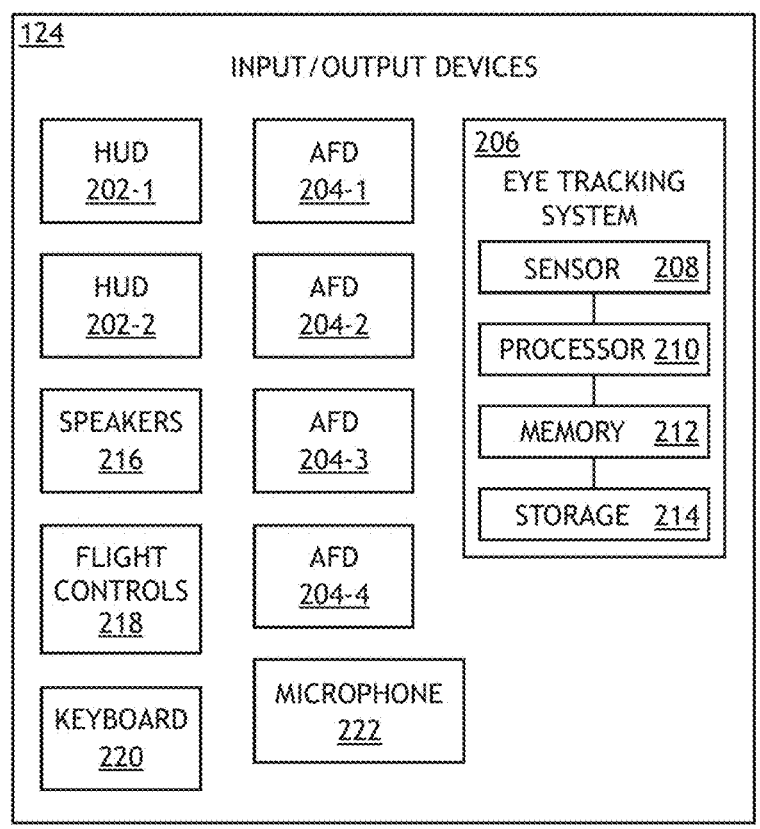
FIG. 2 is a view of the input/output devices of the aircraft of FIG. 1 according to the inventive concepts disclosed herein.

Referring now to FIG. 2, the input/output devices 124 of the aircraft 102 of FIG. 1 may include one or more displays (e.g., at least one head-up display (HUD), at least one adaptive flight display (AFD), or a combination thereof), at least one eye tracking system 206, speakers 216, flight controls 218, at least one keyboard 220, at least one microphone 222, or a combination thereof, some or all of which may be communicatively coupled at any given time. While FIG. 2 depicts the various exemplary input/output devices 124, the input/output devices 124 may include any suitable input/output devices. For example, the input/output devices 124 may include an electronic flight bag (EFB).

For example, the displays of the input/output devices 124 may include two HUDs 202-1, 202-2 (which may collectively be referred to as HUDs 202) and four AFDs 204-1, 204-2, 204-3, 204-4 (which may collectively be referred to as AFDs 204). Each of the HUDs 202 and the AFDs 204 may be configured to present streams of images (e.g., as video or still images) to a user (e.g., a pilot or an operator). In some embodiments, the HUDs 202 and/or AFDs 204 may be implemented as or include a touchscreen display. In some embodiments, one or more of the HUDs 202 and the AFDs 204 may include an integrated computing device (which may be implemented and function similarly to one of the computing devices 112 of FIG. 1) and/or integrated computing device components (which may be implemented and function similarly to components of one of the computing devices 112 of FIG. 1). Each of the HUDs 202 and the AFDs 204 may be communicatively coupled to one or more of the computing devices 112, the communication system 104, the GPS device 120, other of the input/output devices 124, and/or the aircraft sensors 122 of FIG. 1.

The eye tracking system 206 is configured to track eye gestures, track movement of a user's eye, track a user's gaze, and/or otherwise receive inputs from a user's eyes. The eye tracking system 206 may be configured for performing fully automatic eye tracking operations of users in real time. The eye tracking system 206 may include at least one sensor 208, at least one processor 210, a memory 212, and a storage 214, as well as other components, equipment, and/or devices commonly included in an eye tracking system. The sensor 208, the processor 210, the memory 212, and the storage 214, as well as the other components, equipment, and/or devices commonly included in the eye tracking system 206 may be communicatively coupled.

Each sensor 208 may be implemented as any of various sensors suitable for an eye tracking system. For example, the at least one sensor 208 may include or be implemented as one or more optical sensors (e.g., at least one camera configured to capture images in the visible light spectrum and/or the infrared spectrum). In some embodiments, the at least one sensor 208 is one or more dedicated eye tracking system sensors. While the sensor 208 has been exemplarily depicted as being included in the eye tracking system 206, in some embodiments, the sensor 208 may be implemented external to the eye tracking system 206. For example, the sensor 208 may be implemented as an optical sensor (e.g., of the optical sensors 316 of the aircraft sensors 122) located within the aircraft 102 and communicatively coupled to the processor 210.

The processor 210 may be configured to process data received from the sensor 208 and output processed data to one or more onboard devices or onboard systems (e.g., the communication system 104, the computing devices 112, the aircraft sensors 122, other of the input/output devices 124, or a combination thereof). For example, the processor 210 may be configured to generate eye tracking data and output the generated eye tracking data to one of the computing devices 112. The processor 210 of the eye tracking system 206 may be configured to run various software applications or computer code stored (e.g., maintained) in a non-transitory computer-readable medium (e.g., memory 212 and/or storage 214) and configured to execute various instructions or operations. The processor 210 may be implemented as a special purpose processor configured to execute instructions for performing any or all of the operations disclosed throughout.

In some embodiments, some or all of the input/output devices 124 may include an integrated computing device (which may be implemented and function similarly to one of the computing devices 112 of FIG. 1) and/or integrated computing device components (which may be implemented and function similarly to components of one of the computing devices 112 of FIG. 1).

Figure 3:
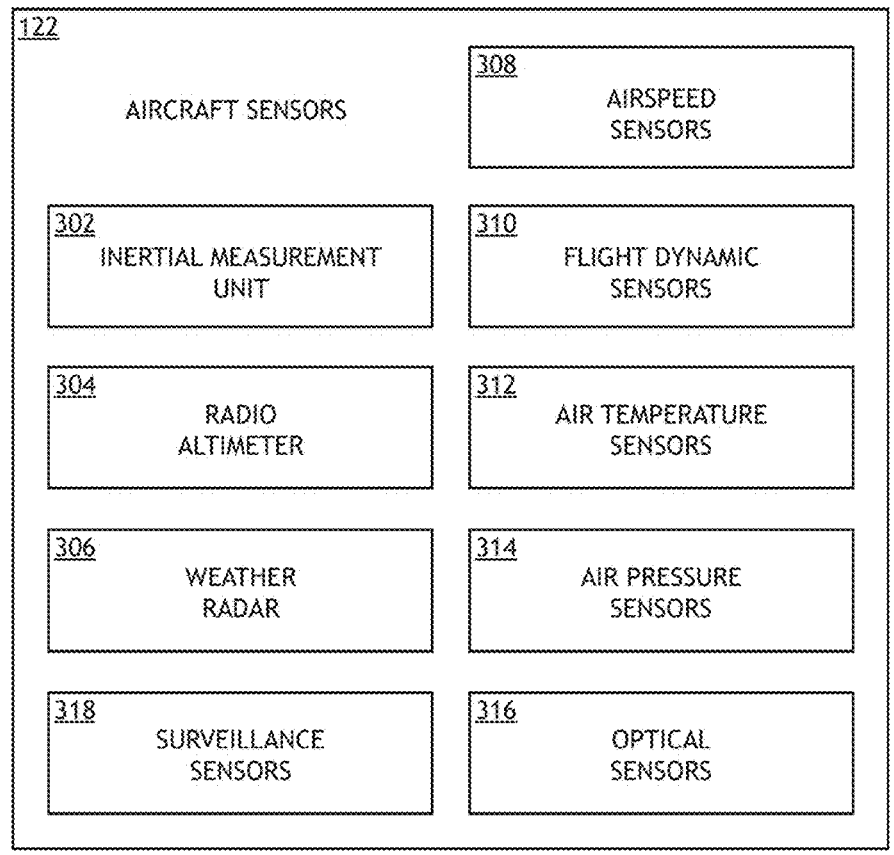
FIG. 3 is a view of the aircraft sensors of the aircraft of FIG. 1 according to the inventive concepts disclosed herein.

Referring now to FIG. 3, the aircraft sensors 122 of FIG. 1 are shown. Each of the aircraft sensors 122 may be configured to sense a particular condition(s) external to the aircraft 102 or within the aircraft 102 and output data associated with particular sensed condition(s) to one or more onboard devices or onboard systems (e.g., the communication system 104, the computing devices 112, the aircraft sensors 122, the input/output devices 124, or a combination thereof). For example, the aircraft sensors 122 may include an inertial measurement unit 302, a radio altimeter 304, weather radar 306, airspeed sensors 308, flight dynamic sensors 310 (e.g., configured to sense pitch, roll, and/or yaw), air temperature sensors 312, air pressure sensors 314, optical sensors 316 (e.g., cameras configured to capture images in the visible light spectrum and/or the infrared spectrum), and surveillance sensors 318, some or all of which may be communicatively coupled at any given time. Additionally, the GPS device 120 may be considered as one of the aircraft sensors 122.

For example, at least some of the aircraft sensors 122 may be implemented as navigation sensors (e.g., the GPS device 120, the inertial measurement unit 302, a radio altimeter 304, weather radar 306, airspeed sensors 308, flight dynamic sensors 310, air temperature sensors 312, and/or air pressure sensors 314) configured to sense any of various flight conditions or aircraft conditions typically used by aircraft and output navigation data (e.g., aircraft location data, aircraft orientation data, aircraft direction data, aircraft speed data, and/or aircraft acceleration data). For example, various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft roll, aircraft yaw, air temperature, and/or air pressure. For example, the GPS device 120 and the inertial measurement unit 302 may provide aircraft location data and aircraft orientation data, respectively, to a processor (e.g., a processor of the GPS device 120, processor 114, processor 114-1, processor 108, processor 210, or a combination thereof).

In some embodiments, some or all of the aircraft sensors 122 may include an integrated computing device (which may be implemented and function similarly to one of the computing devices 112 of FIG. 1) and/or integrated computing device components (which may be implemented and function similarly to components of one of the computing devices 112 of FIG. 1).

Further, while the aircraft sensors 122 are implemented in or on the aircraft 102, some embodiments may include vehicle sensors implemented on any suitable vehicle according to the inventive concepts disclosed herein.

Figure 4:
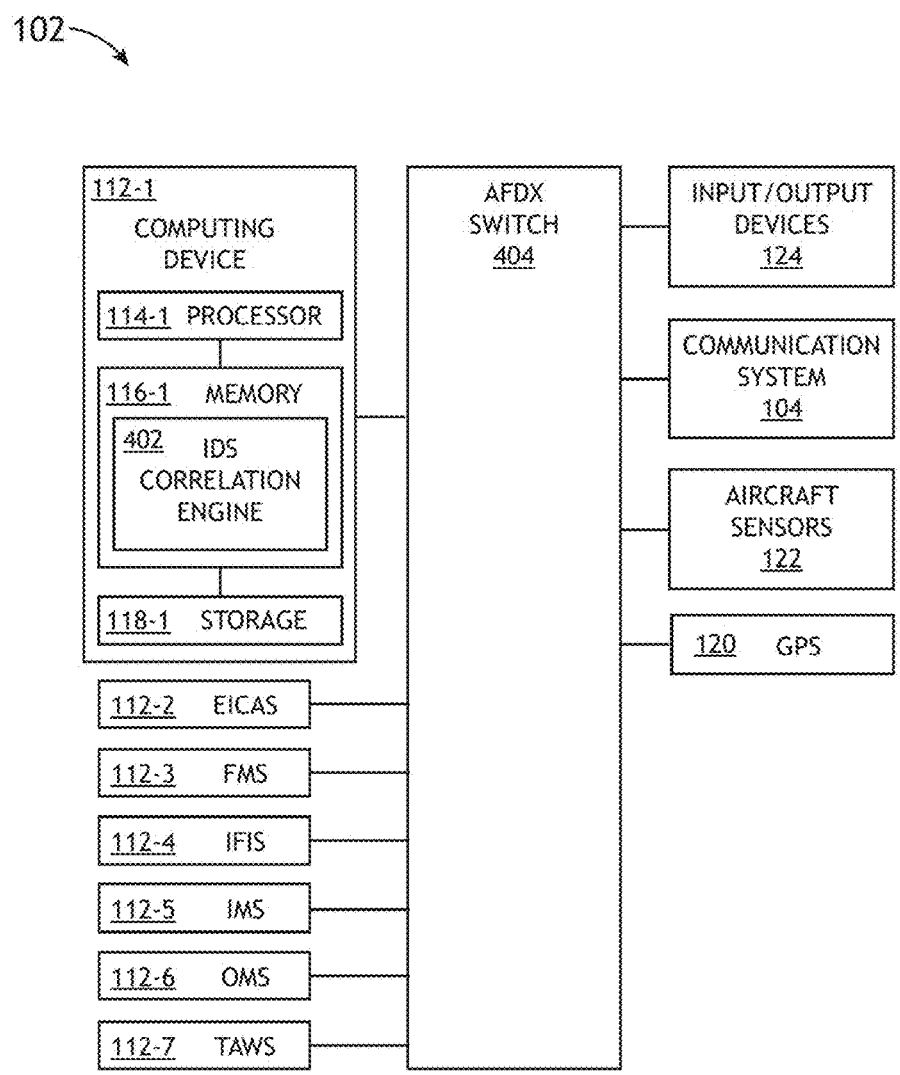
FIG. 4 is a view of exemplary devices of the aircraft of FIG. 1 communicatively coupled via a data network switch of an exemplary embodiment according to the inventive concepts disclosed herein.

Referring now to FIG. 4, various exemplary devices of the aircraft 102 of FIG. 1 communicatively coupled via a data network switch (e.g., an avionics full-duplex Ethernet (AFDX) switch 404) are shown. For example, a plurality of computing devices 112, the input/output devices 124, the communication system 104, vehicular sensors (e.g., the aircraft sensors 122), and the GPS device 120 may be communicatively coupled via the AFDX switch 404. While the plurality of computing devices 112, the input/output devices 124, the communication system 104, the aircraft sensors 122, and the GPS device 120 are exemplarily shown as being communicatively coupled via the AFDX switch 404, in some embodiments some or all of the plurality of computing devices 112, the input/output devices 124, the communication system 104, the vehicular sensors (e.g., the aircraft sensors 122), and the GPS device 120 may be communicatively coupled via any suitable data networks and via any suitable data networking components (e.g., at least one bus (e.g., Aeronautical Radio, Incorporated (ARINC) 429 busses), at least one data concentrator, at least one switch, at least one router, or a combination thereof).

The plurality of computing devices 112 may be implemented as and/or include a plurality of vetronics computing devices, such as a plurality of avionics computing devices (e.g., which may be implemented in one or more integrated modular avionics (IMA) cabinets). The plurality of avionics computing devices may include a first avionics computing device 112-1 (e.g., which may be implemented as the intrusion detection system (IDS) computing device), the engine indication and crew alerting system (EICAS) computing device 112-2, the flight management system (FMS) computing device 112-3, the integrated flight information system (IFIS) computing device 112-4, the information management system (IMS) computing device 112-5, the onboard maintenance system (OMS) computing device 112-6, and the terrain awareness and warning system (TAWS) computing device 112-7. Additionally, the input/output devices 124, the communication system 104, the aircraft sensors 122, the AFDX switch 404, and the GPS device 120 may be considered to be devices of the plurality of avionics computing devices and may be implemented similarly as and function similarly as avionics devices (e.g., 112-1, 112-2, 112-3, 112-4, 112-5, 112-6, 112-7) as disclosed throughout. Each of the plurality of avionics computing devices (e.g., 112-1, 112-2, 112-3, 112-4, 112-5, 112-6, 112-7) may include components, which may be implemented and function similarly as the components of the computing device 112 shown and described with respect to FIG. 1. As such, each of the plurality of avionics computing devices may include at least one processor, memory, and storage, which may be implemented and function similarly as the processor 114, the memory 116, and the storage 118, respectively, of the computing device 112 shown and described with respect to FIG. 1. For example, the first avionics computing device 112-1 (which, for example, may be implemented as the IDS computing device) may include a processor 114-1, memory 116-1, and storage 118-1, which may be implemented and function similarly as the processor 114, the memory 116, and the storage 118, respectively, of the computing device 112 shown and described with respect to FIG. 1.

The plurality of avionics computing devices (e.g., 112-1, 112-2, 112-3, 112-4, 112-5, 112-6, 112-7) and/or processors thereof (e.g., 114-1) may be implemented as special purpose computers (e.g., the first avionics computing device 112-1 implemented as the IDS computing device, the EICAS computing device 112-2, the FMS computing device 112-3, the IFIS computing device 112-4, the IMS computing device 112-5, the OMS computing device 112-6, and the TAWS computing device 112-7) and/or special purpose processors (e.g., the processor 114-1 of the first avionics computing device 112-1 programmed to execute instructions for performing IDS operations as disclosed throughout, a processor of the EICAS computing device 112-2 programmed to execute instructions for performing EICAS operations as disclosed throughout, a processor of the FMS computing device 112-3 programmed to execute instructions for performing FMS operations as disclosed throughout, a processor of the IFIS computing device 112-4 programmed to execute instructions for performing IFIS operations as disclosed throughout, a processor of the IMS computing device 112-5 programmed to execute instructions for performing IMS operations as disclosed throughout, a processor of the OMS computing device 112-6 programmed to execute instructions for performing OMS operations as disclosed throughout, and a processor of the TAWS computing device 112-7 programmed to execute instructions for performing TAWS operations as disclosed throughout) configured to execute instructions for performing any or all of the operations disclosed throughout.

As shown in FIG. 4, the first computing device 112-1, which may be implemented as the IDS computing device, may include at least one IDS engine (e.g., an IDS correlation engine 402 and/or an IDS aberrant data engine) stored (e.g., maintained) as software, code, or processor-executable instructions in a non-transitory computer-readable medium (e.g., the memory 116-1). For example, the IDS correlation engine 402 may also be referred to as a cyber security correlation engine. By executing the IDS correlation engine 402, the processor 114-1 may be configured to perform any of various intrusion detection correlation operations (which may also be referred to as cyber security correlation operations) according to inventive concepts as disclosed throughout. The IDS computing device (e.g., 112-1) may be configured to perform any suitable intrusion detection operations with respect to any suitable domain or combination of domains (e.g., aircraft control domain (ACD), airline information services domain (AISD), the passenger information & entertainment services domain (PIESD), at least one vehicular domain, or a combination thereof). In some embodiments, another avionics computing device (e.g., 112-2, 112-3, 112-4, 112-5, 112-6, 112-7) may be implemented as the IDS computing device and may include an IDS correlation engine 402, for example, stored as software, code, or processor-executable instructions in a non-transitory computer-readable medium.

For example, the processor 114-1 of the IDS computing device (e.g., 112-1) may be configured (e.g., programmed) to receive data (e.g., sent as reports, such as cyber security reports) from one or more of the plurality of avionics computing devices (e.g., 112-2, 112-3, 112-4, 112-5, 112-6, 112-7). The processor 114-1 may be configured (e.g., programmed) to process (e.g., modify, sort, and/or analyze) the received data (e.g., reports). The processor 114-1 may be configured (e.g., programmed) to store (e.g., maintain) the received data and/or processed received data, as well as information about the received data events (e.g., information about the sender avionics computing device, time, and/or location), in at least one data structure (e.g., at least one database, at least one file, at least one journal, at least one table, at least one linked list, or a combination thereof) stored in at least one computer-readable medium (e.g., the memory 116-1 and/or the storage 118-1). Additionally, in substantially real time or after the received data (e.g., reports) is stored in the computer readable medium, the processor 114-1 may be configured (e.g., programmed) to analyze the received data (e.g., reports) according to predetermined filter rules to filter out false positive received data that is indicative of false positive cyber security threats. For example, false positive received data may be stored in a false positive data structure of a computer readable medium or discarded. Further, the processor 114-1 may be configured (e.g., programmed) to output at least a portion of the filtered received data (e.g., filtered reports) to another computing device (which may be interfaceable by a user (e.g., a subject matter expert)) and/or to an input/output device (e.g., a display) configured to present (e.g., graphically present) at least a portion of the filtered received data (e.g., filtered reports) to a user (e.g., a subject matter expert). Additionally, in some embodiments, the processor 114-1 may be configured (e.g., programmed) to analyze the received data and/or the filtered received data and determine the occurrence of a cyber security threat (e.g., cyber security attack or cyber security intrusion) based at least on at least a portion of the received data and/or the filtered received data; in response to determining the occurrence of the cyber security threat, the processor 114-1 may be configured to generate and output cyber security threat data associated with the determined cyber security threat to another computing device (which may be interfaceable by a user), to an input/output device (e.g., a display) configured to present (e.g., graphically present) the data associated with the determined cyber security threat to a user, and/or to a computer-readable medium (e.g., memory 116-1 and/or storage 118-1) to be stored (e.g., maintained).

Additionally, for example, after a user (e.g., the subject matter expert) reviews the filtered received data (e.g., filtered reports), the user may interface with the IDS computing device 112-1 and/or another computing device to update the predetermined filter rules. For example, the user may reprogram the existing filter rules and/or add additional filter rules. Based on the updated filter rules, the processor 114-1 may be configured to filter out a higher percentage of false positive cyber security threats.

In some embodiments, the processor 114-1 or another processor of the system 100 may be configured to analyze the filtered received data (e.g., filtered reports), for example, by analyzing (e.g., statistically analyzing, correlating, applying a machine learning algorithm, and/or recognizing patterns in) previously filtered received data and verified cyber security threat data and/or missed false positive cyber security threat data corresponding to false positives which passed the filtering according to the predetermined filter rules. Based at least on analyzing the filtered received data, the processor 114-1 or another processor of the system 100 may be configured to suggest updated filter rules to a user (e.g., a subject matter expert). Additionally, for example, based at least on analyzing the filtered received data, the processor 114-1 or another processor of the system 100 may be configured to automatically or semi-automatically update and reprogram the existing filter rules and/or add additional filter rules.

While the first computing device 112-1 has been exemplarily depicted and described as including the IDS correlation engine 402 stored (e.g., maintained) in the memory 116-1, in some embodiments, IDS correlation engine(s) (e.g., 402) may be implemented in any one or any combination of at least one of the avionics computing devices (e.g., 112-1, 112-2, 112-3, 112-4, 112-5, 112-6, 112-7), at least one of the computing devices 112, at least one of the aircraft sensors 122, at least one GPS device 120, at least one communication system 104, at least one of the input/output devices 124, and at least one data network switch (e.g., AFDX switch 404). For example, multiple instances of the IDS correlation engine 402 may be located in multiple avionics computing devices of the aircraft 102 and operate as a distributed IDS with multiple distributed IDS correlation engines 402. Additionally, while not shown in FIG. 4, in some embodiments, at least one IDS correlation engine (e.g., 402) or at least one instance of the IDS correlation engine 402 may be implemented in an off-board computing device (e.g., computing device 130 and/or a computing device of the NOC 138) that is communicatively coupled (e.g., via the satellites 132, the network 136, the NOC 138, the communication system 128, and/or the communication system 104) with one or more of the avionics computing devices (e.g., 112-1, 112-2, 112-3, 112-4, 112-5, 112-6, 112-7).

In some embodiments, data associated with at least one IDS engine (e.g., at least one of the IDS correlation engine 402) is integrated (e.g., loaded, interpreted, compiled, assembled, translated, or a combination thereof and/or incorporated, appended, added, loaded, inserted, written, injected, embedded, or a combination thereof) into at least one existing (e.g., currently implemented, currently installed, and/or currently deployed but yet to be implemented as including an IDS correlation engine (e.g., 402)) or standard (e.g., typical and/or customary but yet to be implemented as including an IDS correlation engine (e.g., 402)) software module of a computing device (e.g., an existing or standard vetronics (e.g., avionics) computing device). Such software modules may refer to software modules, middleware modules, and/or firmware modules. For example, an existing or standard software module may refer to any software module of (e.g., stored in a non-transitory computer-readable medium of) a vetronics computing device (e.g., avionics computing device) that has yet to be modified to include at least one integrated IDS engine (e.g., at least one IDS correlation engine). For example, software modules of a computing device (e.g., vetronics computing device (e.g., avionics computing device (e.g., 112-1, 112-2, 112-3, 112-4,

112-5, 112-6, 112-7))) may include at least one system software module (e.g., at least one OS, at least one kernel, at least one microkernel, or a combination thereof), at least one application software module (e.g., at least one application, at least one computer program, or combination thereof), at least one service, at least one shell, at least one library, at least one file, at least one software server, at least one manager (e.g., at least one network manager), at least one process (e.g., at least one init process, at least one background process (e.g., daemon), or a combination thereof), at least one driver (e.g., at least one device driver, at least one virtual device driver, or a combination thereof), at least one driver wrapper, at least one protocol stack (sometimes referred to as a networking stack; e.g., at least one internet protocol (IP) stack, at least one Hypertext Transfer Protocol (HTTP) stack, at least one Transmission Control Protocol (TCP) stack, at least one Ethernet protocol stack, or a combination thereof), or a combination thereof. For an example, an existing or standard software module may be modified (e.g., added to, expanded, appended, encapsulated, injected with computer code, or a combination thereof) to include the IDS correlation engine such that the IDS correlation engine 402 is implemented as a portion (e.g., at least one set of IDS correlation engine computer code or computer instructions, at least one IDS correlation engine software module, or a combination thereof) integrated into the existing or standard software module. In some embodiments, the computing device 112-1 includes a plurality of modified existing or standard software modules, each of the plurality of modified existing or standard software modules having been modified to include at least one IDS engine (e.g., at least one of the IDS correlation engine 402).

The EICAS computing device 112-2 may be configured to provide aircraft crew with information (e.g., as annunciations (e.g., as messages and/or alerts) and instrumentation (e.g., which may be graphically displayed on any suitable display)) about engines and other systems of the aircraft 102. A processor of the EICAS computing device 112-2 may be configured to perform any of various, suitable operations, which are commonly performed by EICASs, as would be appreciated by those skilled in the art, such as receiving messages, performing error detection and mitigation operations on received messages, and performing fault-tolerance voting calculations (e.g., to identify an invalid solution based on a percentage deviation from the other solutions). In addition to performing commonly performed operations, some embodiments include a processor of the EICAS computing device 112-2 being configured (e.g., programmed) to perform additional operations.

The FMS computing device 112-3 may be configured to automate various in-flight tasks, such as managing a flight plan of the aircraft 102. A processor of the FMS computing device 112-3 may be configured to perform any of various, suitable operations, which are commonly performed by FMSs, as would be appreciated by those skilled in the art, such as receiving messages, performing error detection and mitigation operations on received messages, and performing fault-tolerance voting calculations (e.g., to identify an invalid solution based on a percentage deviation from the other solutions). In addition to performing commonly performed operations, some embodiments include the processor of the FMS computing device 112-3 being configured (e.g., programmed) to perform additional operations.

A processor of the IFIS computing device 112-4 may be configured to perform any of various, suitable operations, which are commonly performed by IFISs, as would be appreciated by those skilled in the art, such as receiving messages and performing error detection and mitigation operations on received messages. In addition to performing commonly performed operations, some embodiments include the processor of the IFIS computing device 112-4 being configured (e.g., programmed) to perform additional operations.

A processor of the IMS computing device 112-5 may be configured to perform any of various, suitable operations, which are commonly performed by IMSs, as would be appreciated by those skilled in the art, such as receiving messages and performing error detection and mitigation operations on received messages. In addition to performing commonly performed operations, some embodiments include the processor of the IMS computing device 112-5 being configured (e.g., programmed) to perform additional operations.

A processor of the OMS computing device 112-6 may be configured to perform any of various, suitable operations, which are commonly performed by OMSs, as would be appreciated by those skilled in the art, such as collecting and monitoring health data, receiving messages, and performing error detection and mitigation operations on received messages. In addition to performing commonly performed operations, some embodiments include the processor of the OMS computing device 112-6 being configured (e.g., programmed) to perform additional operations. Additionally, for example, the OMS computing device 112-6 may be implemented as the IDS computing device and may include an IDS correlation engine 402 stored (e.g., maintained) as software, code, or processor-executable instructions in a non-transitory computer-readable medium. In embodiments where the OMS computing device 112-6 is implemented as the IDS computing device, collocation of the IDS correlation engine 402 on the OMS computing device 112-6 may improve filtering of failure events and cyber security events because failure events and false cyber attacks can have similar characteristics and because false failure events and false cyber attacks can have similar characteristics. Additionally, for example, collocation of the IDS correlation engine 402 with the OMS computing device 112-6 can simplify IDS implementation because the OMS computing device 112-6 may share substantially the same system connectivity requirements without significantly impacting configuration of the AFDX switch 404, thus allowing for reduced (e.g., minimal) certification requirements.

A processor of the TAWS computing device 112-7 may be configured to perform any of various, suitable operations, which are commonly performed by TAWSs, as would be appreciated by those skilled in the art, such as receiving messages, performing error detection and mitigation operations on received messages, and performing fault-tolerance voting calculations (e.g., to identify an invalid solution based on a percentage deviation from the other solutions). In addition to performing commonly performed operations, some embodiments include the processor of the TAWS computing device 112-7 being configured (e.g., programmed) to perform additional operations.

In addition to performing commonly performed operations, some embodiments include one or more of the plurality of computing devices (e.g., the plurality of avionics computing devices (e.g., 112-2, 112-3, 112-4, 112-5, 112-6, 112-7) being configured (e.g., programmed) to perform additional operations.

For example, the processor of the EICAS computing device 112-2 may be configured to receive messages from other devices (e.g., another computing device 112 (e.g., another avionics computing device), the input/output devices 124, the communication system 104, the aircraft sensors 122, the GPS device 120, the data network switch, an off-board device, or a combination thereof). For example, such messages may be transmitted by another device, routed over network components (e.g., busses) through a data network switch (e.g., the AFDX switch 404), and received by the EICAS computing device 112-2. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

For example, the processor of the EICAS computing device 112-2 may be configured to analyze one or more (e.g., one, some, or all) of the received messages, determine whether one or more of the received messages includes aberrant (e.g., anomalistic, abnormal, unexpected, and/or erroneous) data (e.g., parity error(s), differential error(s), data out-of-range error(s) (e.g., sensor data out-of-range error(s)), invalid pad bit(s), invalid value(s) (e.g., invalid check sum value(s), invalid cyclic redundancy check value (s), invalid hash value(s) (e.g., invalid cryptographic hash value)), or a combination thereof), and upon a determination that a particular received message(s) includes aberrant data, transmit (e.g., report) data (e.g., at least one message and/or value as one or more signals) to the IDS computing device (e.g., 112-1), wherein the transmitted data (e.g., data sent as a report) may include information related to the particular received message(s) and/or aberrant data. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

For example, the processor of the EICAS computing device 112-2 may be configured to determine whether a received message has a correct parity. Upon a determination that the received message has an incorrect parity, the processor may send (e.g., report) data to the IDS computing device (e.g., 112-1), wherein the sent data (e.g., data sent as a report) may include information related to the received message and/or parity error. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

For example, the processor of the EICAS computing device 112-2 may be configured to determine whether a received message has in-range sensor data (e.g., sensor data that is in an expected value range). Upon a determination that the received message has out-of-range sensor data, the processor may send (e.g., report) data to the IDS computing device (e.g., 112-1), wherein the sent data (e.g., data sent as a report) may include information related to the received message and/or out-of-range sensor data. For example, the processor of the EICAS computing device 112-2 may be configured to detect data out-of-range errors for the airspeed sensors 308 by determining that the airspeed sensors' 308 sensed airspeed changes are greater than an acceleration capability of the aircraft 102. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

For example, the processor of the EICAS computing device 112-2 may be configured to determine whether a received message has fail-operational (e.g., a system is still operable without significant change in objectives or performance) differential in-range redundant sensor data (e.g., differential sensor data (e.g., a difference of two or more sensor data values) between or among redundant sensors is in an expected value range such that a particular system is still operable without significant change in objectives or performance). Upon a determination that the received message has differential out-of-range redundant sensor data, the processor may send (e.g., report) data to the IDS computing device (e.g., 112-1), wherein the sent data (e.g., data sent as a report) may include information related to the received message, differential error, and/or differential out-of-range redundant sensor data. For example, the processor of the EICAS computing device 112-2 may be configured to compare data from redundant data sources (e.g., the aircraft sensors 122) and vote for (e.g., select) data from one or more of the redundant data sources while rejecting data from other of the redundant data sources. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

For example, the processor of the EICAS computing device 112-2 may be configured to determine whether a received message has valid pad bits. Upon a determination that the received message has an invalid pad bit(s), the processor may send (e.g., report) data to the IDS computing device (e.g., 112-1), wherein the sent data (e.g., data sent as a report) may include information related to the received message and/or the invalid pad bit(s). While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

For example, the processor of the EICAS computing device 112-2 may be configured to determine whether a received message has valid values (e.g., valid check sum values, cyclic redundancy check values, and/or cryptographic hash values). Upon a determination that the received message has an invalid value(s), the processor may send (e.g., report) data to the IDS computing device (e.g., 112-1), wherein the sent data (e.g., data sent as a report) may include information related to the received message and/or the invalid value(s). While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

For example, the processor of the EICAS computing device 112-2 may be configured to determine whether a received message includes valid health data (e.g., health status data; valid heart beat health data). Upon a determination that the received message has invalid health data or lacks valid health data, the processor may send (e.g., report) data to the IDS computing device (e.g., 112-1), wherein the sent data (e.g., data sent as a report) may include information related to the received message, a lack of valid health data, and/or invalid health data. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

For example, the processor of the EICAS computing device 112-2 may be configured to determine whether a received message has a valid format. Upon a determination that the received message has an invalid format or a format error, the processor may send (e.g., report) data to the IDS computing device (e.g., 112-1), wherein the sent data (e.g., data sent as a report) may include information related to the received message, a valid format for the received message, the format error, and/or the invalid format. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

For example, the processor of the EICAS computing device 112-2 may be configured to determine whether a received message has a valid length. Upon a determination that the received message has an invalid length or a length error, the processor may send (e.g., report) data to the IDS computing device (e.g., 112-1), wherein the sent data (e.g., data sent as a report) may include information related to the received message, a valid length for the received message, the length error, and/or the invalid length. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

For example, the processor of the EICAS computing device 112-2 may be configured to determine whether a received message has a valid state (e.g., a valid protocol state). Upon a determination that the received message has an invalid state or a state error, the processor may send (e.g., report) data to the IDS computing device (e.g., 112-1), wherein the sent data (e.g., data sent as a report) may include information related to the received message, a valid state for the received message, the state error, and/or the invalid state. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

Further, for example, the processor of the EICAS computing device 112-2 may be configured to cross-compare data (e.g., critical data) from different types of data sources (e.g., different types of aircraft sensors 122 and/or from different types of avionics computing devices) to determine whether a received message has data value(s) from a first data source that are consistent with a data value(s) from a second data source. Upon a determination that the received message has a data value(s) inconsistent with another data source, the processor may send (e.g., report) data to the IDS computing device (e.g., 112-1), wherein the sent data (e.g., data sent as a report) may include information related to the received message, a range of consistent data values, the data value(s), the cross-compared data value(s), and/or the data sources. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

Further, for example, the processor of the EICAS computing device 112-2 may be configured to determine whether a plurality of received messages has a valid rate (e.g., data rate or message rate). Upon a determination that the received message has an invalid rate, the processor may send (e.g., report) data to the IDS computing device (e.g., 112-1), wherein the sent data (e.g., data sent as a report) may include information related to the received messages, a range of valid rates, and/or the invalid rate value(s). While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

Additionally, for example, the processor of the EICAS computing device 112-2 may be configured to rate limit reports (e.g., data sent (e.g., reported), cybersecurity reports or intrusion detection reports) to the IDS computing device (e.g., 112-1), to avoid denial of service to avionics functions. While exemplary functionality of the EICAS computing device 112-2 has been described with respect to an exemplary embodiment, in some embodiments processor(s) of any or all of the plurality of avionics computing devices (e.g., 112-2, 112-3, 112-4, 112-5, 112-6, 112-7) may be configured (e.g., programmed) similarly as the processor of the EICAS computing device 112-2 to perform similar operations.

In some embodiments, with respect to vetronics computing devices (e.g., avionics computing devices, such as 112-1, 112-2, 112-3, 112-4, 112-5, 112-6, 112-7) data associated with at least one IDS engine (e.g., at least one of the IDS aberrant data engine) is integrated (e.g., loaded, interpreted, compiled, assembled, translated, or a combination thereof and/or incorporated, appended, added, loaded, inserted, written, injected, embedded, or a combination thereof) into at least one existing (e.g., currently implemented, currently installed, and/or currently deployed but yet to be implemented as including an IDS aberrant data engine) or standard (e.g., typical and/or customary but yet to be implemented as including an IDS aberrant data engine) software module of a vetronics (e.g., avionics) computing device (e.g., an existing or standard vetronics computing device). Such software modules may refer to software modules, middleware modules, and/or firmware modules. For example, an existing or standard software module may refer to any software module of (e.g., stored in a non-transitory computer-readable medium of) a vetronics computing device (e.g., avionics computing device) that has yet to be modified to include at least one integrated IDS engine (e.g., at least one IDS aberrant data engine). For example, software modules of a vetronics computing device (e.g., avionics computing device (e.g., 112-1, 112-2, 112-3, 112-4, 112-5, 112-6, 112-7)) may include at least one system software module (e.g., at least one OS, at least one kernel, at least one microkernel, or a combination thereof), at least one application software module (e.g., at least one application, at least one computer program, or combination thereof), at least one service, at least one shell, at least one library, at least one file, at least one software server, at least one manager (e.g., at least one network manager), at least one process (e.g., at least one init process, at least one background process (e.g., daemon), or a combination thereof), at least one driver (e.g., at least one device driver, at least one virtual device driver, or a combination thereof), at least one driver wrapper, at least one protocol stack (sometimes referred to as a networking stack; e.g., at least one internet protocol (IP) stack, at least one Hypertext Transfer Protocol (HTTP) stack, at least one Transmission Control Protocol (TCP) stack, at least one Ethernet protocol stack, or a combination thereof), or a combination thereof. For an example, an existing or standard software module may be modified (e.g., added to, expanded, appended, encapsulated, injected with computer code, or a combination thereof) to include the IDS aberrant data engine such that the IDS aberrant data engine is implemented as a portion (e.g., at least one set of IDS aberrant data engine computer code or computer instructions, at least one IDS aberrant data engine software module, or a combination thereof) integrated into the existing or standard software module. In some embodiments, a vetronics computing device includes a plurality of modified existing or standard software modules, each of the plurality of modified existing or standard software modules having been modified to include at least one IDS engine (e.g., at least one IDS aberrant data engine).

In some embodiments, at least one, some, or all of the vetronics computing devices (e.g., avionics computing devices, such as 112-1, 112-2, 112-3, 112-4, 112-5, 112-6, 112-7) may include multiple types of IDS engines (e.g., IDS correlation engine(s) and IDS aberrant data engine(s) (e.g., IDS aberrant data determination and reporting engine(s))). For example, at least one non-transitory computer-readable medium of each of a plurality of vetronics computing devices may be configured to store a plurality of software modules, wherein the plurality of software modules includes at least one first modified software module integrated with at least one IDS correlation engine and at least one second modified software module integrated with at least one IDS aberrant data engine. Each of the at least one first modified software module includes at least one IDS correlation engine and may optionally also include at least one IDS aberrant data engine. Each of the at least one second modified software module includes at least one IDS aberrant data engine and may optionally also include at least one IDS correlation engine. In some embodiments, one, some, or all of the IDS engine(s) (e.g., IDS correlation engine(s) and/or IDS aberrant data engines(s)) of a particular computing device may be controllably activated or deactivated based at least on one or more received control messages (e.g., control signals) received by the associated vetronics computing device, for example, from an off-board computing device, another on-board computing device, and/or a particular processor of the particular computing device. For example, sending control signals allow a particular computing device to dynamically designate computing device(s) to have activated IDS correlation engine(s) such that the particular computing device is switched from actively performing operations associated with the IDS correlation engine(s) to merely reporting data (e.g., associated with a received message determined to include aberrant data) so that a different computing device may be designated to actively perform operations associated with the IDS correlation engine(s).

While the first avionics computing device 112-1, the EICAS computing device 112-2, the FMS computing device 112-3, the IFIS computing device 112-4, the IMS computing device 112-5, the OMS computing device 112-6, and the TAWS computing device 112-7 of the aircraft 102 have been exemplarily depicted as being implemented as separate avionics computing devices, in some embodiments, some or all of the first avionics computing device 112-1, the EICAS computing device 112-2, the FMS computing device 112-3, the IFIS computing device 112-4, the IMS computing device 112-5, the OMS computing device 112-6, and the TAWS computing device 112-7 may be implemented as a single integrated computing device or as any number of integrated and/or partially integrated computing devices.

Additionally, in some embodiments, the data network switch (e.g., the AFDX switch 404) may be implemented similarly as and function similarly to one of the avionics computing devices (e.g., 112-1, 112-2, 112-3, 112-4, 112-5, 112-6, or 112-7) or include components that function similarly to components of one of the avionics computing devices. For example, the AFDX switch 404 may include an integrated computing device (which may be implemented and function similarly to one of the computing devices 112 (e.g., one of the avionics computing devices (e.g., 112-1, 112-2, 112-3, 112-4, 112-5, 112-6, or 112-7))) and/or integrated computing device components (which may be implemented and function similarly to components of one of the computing devices 112 of FIG. 1).

Further, while the plurality of avionics computing devices has been exemplarily depicted and described with respect to FIG. 4 as including the first avionics computing device 112-1, the EICAS computing device 112-2, the FMS computing device 112-3, the IFIS computing device 112-4, the IMS computing device 112-5, the OMS computing device 112-6, and the TAWS computing device 112-7, in some embodiments, the plurality of avionics computing devices may omit one or more of the described and depicted avionics computing devices, include additional numbers of such avionics computing devices, and/or include other types of suitable avionics computing devices.

Figure 5:
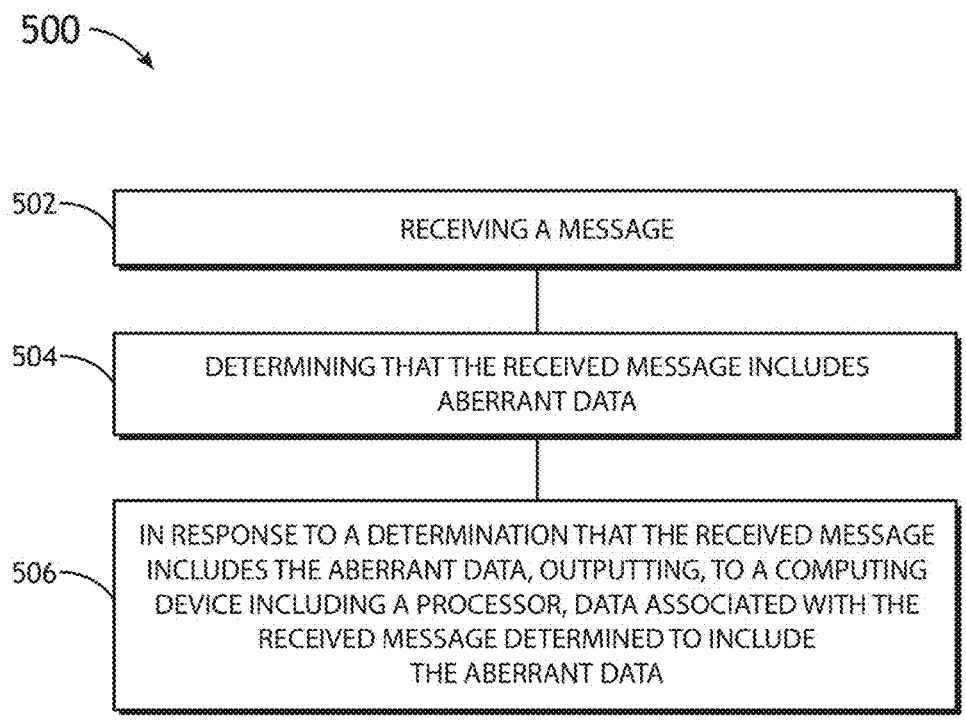
FIG. 5 is a diagram of an exemplary embodiment of a method according to the inventive concepts disclosed herein.

Referring now to FIG. 5, an exemplary embodiment of a method 500 according to the inventive concepts disclosed herein may include one or more of the following steps, which, for example, may be performed by at least one processor of a computing device 112 (e.g., a vetronics computing device (e.g., an avionics computing device, such as 112-2, 112-3, 112-4, 112-5, 112-6, 112-7)). For example, the method 500 may be a method for improving the functioning of a vetronics computing device (e.g., an avionics computing device (e.g., 112-1, 112-2, 112-3, 112-4, 112-5, 112-6, 112-7)), itself. Performance of the method 500 may improve the functioning of the vetronics computing device, itself, for example, by increasing the expected useful life of the vetronics computing device, increasing available processing resources, increasing available processing resources, increasing available on-device networking resources, reducing power consumed by the vetronics computing device, itself, increasing available bandwidth for the vetronics computing device, itself, and/or reducing data flow congestion on networking components of the vetronics computing device, itself. Additionally, for example, some embodiments may include multiple vetronics computing devices (e.g., avionics computing device, such as 112-1, 112-2, 112-3, 112-4, 112-5, 112-6, 112-7) each performing one more instances of the method iteratively, concurrently, and/or sequentially.

A step 502 may include receiving a message.

A step 504 may include determining that the received message includes aberrant data.

A step 506 may include in response to a determination that the received message includes the aberrant data, outputting, to a computing device (e.g., 112-1, 112, or 130) including a processor (e.g., 114 or 114-1), data associated with the received message determined to include the aberrant data.

Further, the method 500 may include any of the operations disclosed throughout.

Figure 6:
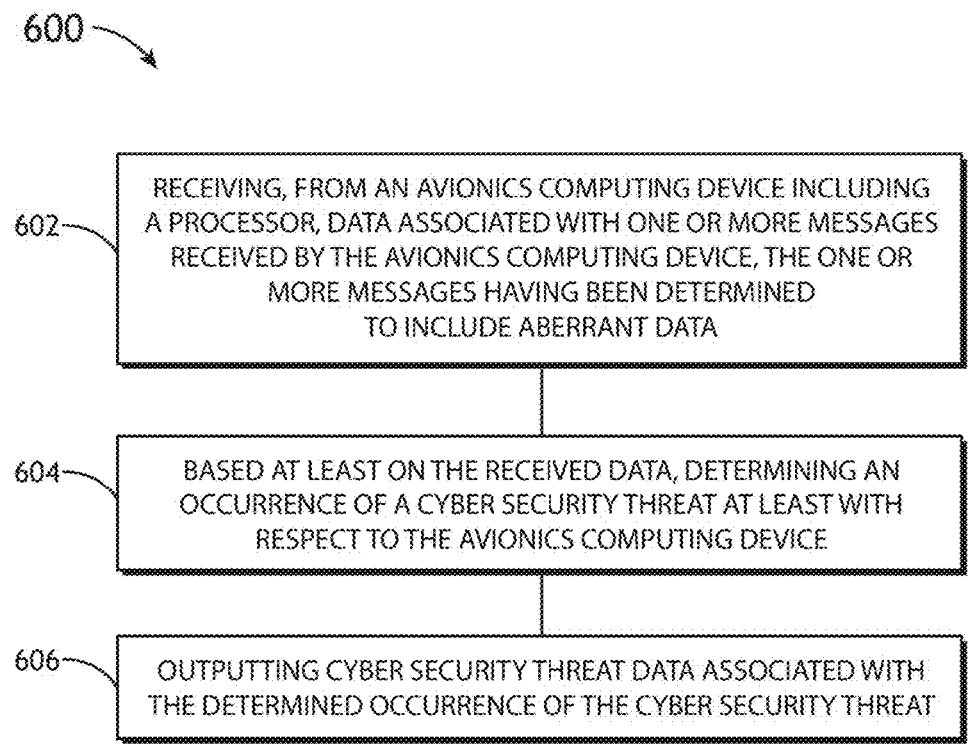
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps, which, for example, may be performed by at least one processor of a computing device (e.g., computing device 112, a vetronics computing device (e.g., an avionics computing device (e.g., 112-1, 112-2, 112-3, 112-4, 112-5, 112-6, or 112-7))), a computing device 130, a computing device of the NOC 138). For example, the method 600 may be a method for improving the functioning of the computing device, itself. Performance of the method 600 may improve the functioning of the computing device, itself, for example, by increasing the expected useful life of the computing device, increasing available processing resources, increasing available processing resources, increasing available on-device networking resources, reducing power consumed by the computing device, itself, increasing available bandwidth for the computing device, itself, and/or reducing data flow congestion on networking components of the computing device, itself. Additionally, for example, some embodiments may include multiple computing devices (e.g., at least one computing device 112, at least one avionics computing device (e.g., 112-1, 112-2, 112-3, 112-4, 112-5, 112-6, and/or 112-7), at least one computing device 130, at least one computing device of the NOC 138, or a combination thereof) of the system 100 each performing one more instances of the method iteratively, concurrently, and/or sequentially.

A step 602 may include receiving, from an avionics computing device (e.g., 112-2, 112-3, 112-4, 112-5, 112-6, or 112-7) including a processor, data associated with one or more messages received by the avionics computing device, the one or more messages having been determined to include aberrant data.

A step 604 may include, based at least on the received data, determining an occurrence of a cyber security threat at least with respect to the avionics computing device.

A step 606 may include outputting cyber security threat data associated with the determined occurrence of the cyber security threat.

Further, the method 600 may include any of the operations disclosed throughout.

Figure 7:
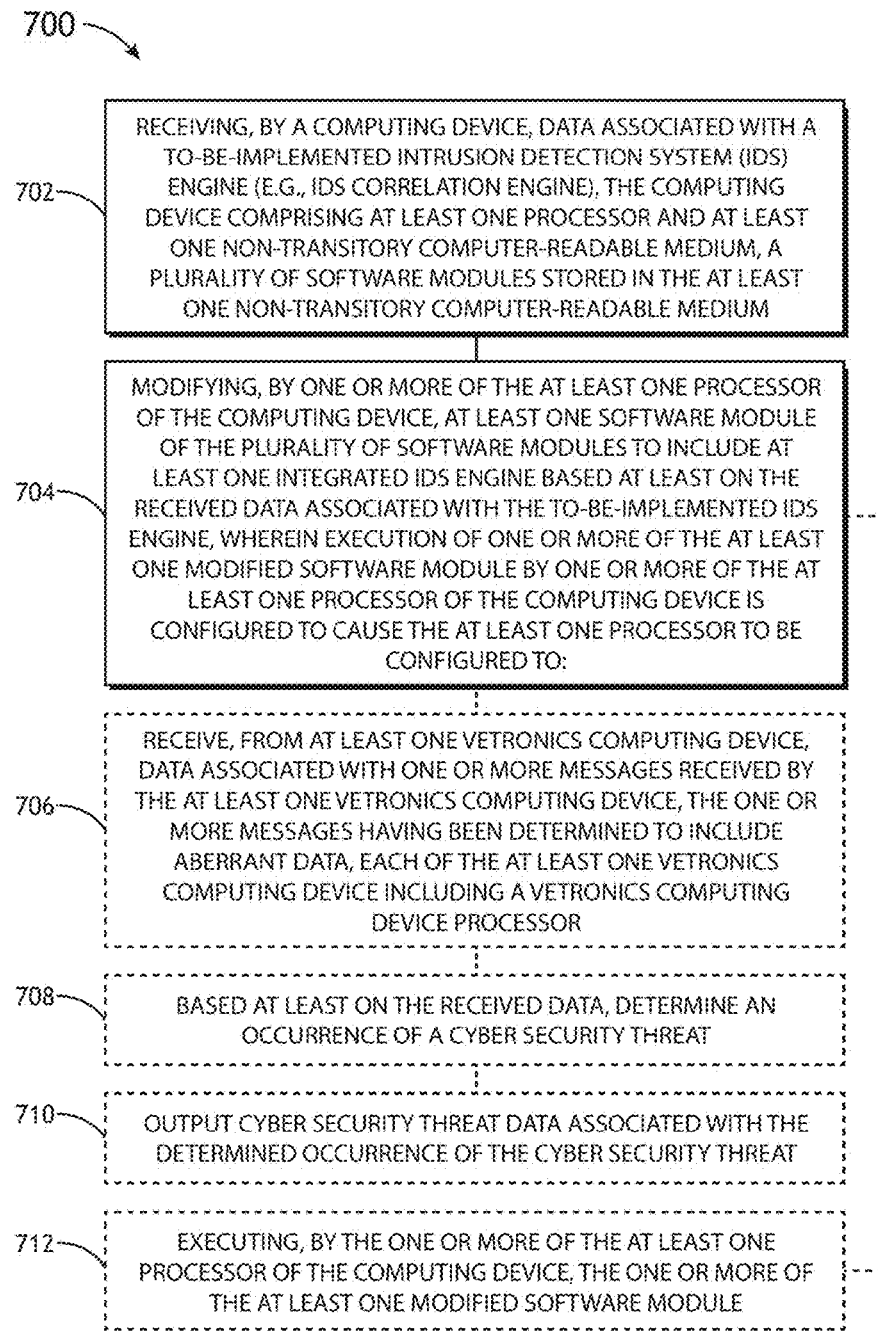
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps, which, for example, may be performed by at least one processor of a computing device (e.g., computing device 112, a vetronics computing device (e.g., an avionics computing device (e.g., 112-1, 112-2, 112-3, 112-4, 112-5, 112-6, or 112-7)), a computing device 130, a computing device of the NOC 138). For example, the method 700 may be a method for improving the functioning of a computing device (e.g., 112), itself, such as by upgrading a standard or existing computing device to improve the functioning of the computing device, itself. Performance of the method 700 may improve the functioning of the computing device, itself, for example, by increasing the expected useful life of the computing device, increasing available processing resources, increasing available processing resources, increasing available on-device networking resources, reducing power consumed by the computing device, itself, increasing available bandwidth for the computing device, itself, and/or reducing data flow congestion on networking components of the computing device, itself. Additionally, for example, some embodiments may include multiple computing devices (e.g., at least one computing device 112, at least one avionics computing device (e.g., 112-1, 112-2, 112-3, 112-4, 112-5, 112-6, and/or 112-7), at least one computing device 130, at least one computing device of the NOC 138, or a combination thereof) of the system 100 each performing one more instances of the method iteratively, concurrently, and/or sequentially.

A step 702 may include receiving, by a computing device, data associated with at least one to-be-implemented intrusion detection system (IDS) engine (e.g., IDS correlation engine), the computing device comprising at least one processor and at least one non-transitory computer-readable medium, a plurality of software modules stored in the at least one non-transitory computer-readable medium.

A step 704 may include modifying, by one or more of the at least one processor of the computing device, at least one software module of the plurality of software modules to include at least one integrated IDS engine based at least on the received data associated with the at least one to-be-implemented IDS engine, wherein execution of one or more of the at least one modified software module by one or more of the at least one processor of the computing device is configured to cause the at least one processor to be configured to: perform a step 706 of receiving, from at least one vetronics computing device, data associated with one or more messages received by the at least one vetronics computing device, the one or more messages having been determined to include aberrant data, each of the at least one vetronics computing device including a vetronics computing device processor; perform a step 708 of based at least on the received data, determining an occurrence of a cyber security threat; and/or perform a step 710 of outputting cyber security threat data associated with the determined occurrence of the cyber security threat.

A step 712 may include executing, by the one or more of the at least one processor of the computing device, the one or more of the at least one modified software module. The step 712 may include causing the at least one processor to be configured to: perform the step 706 of receiving, from at least one vetronics computing device, data associated with one or more messages received by the at least one vetronics computing device, the one or more messages having been determined to include aberrant data, each of the at least one vetronics computing device including a vetronics computing device processor; perform the step 708 of based at least on the received data, determining an occurrence of a cyber security threat; and/or perform the step 710 of outputting cyber security threat data associated with the determined occurrence of the cyber security threat.

Further, the method 700 may include any of the operations disclosed throughout.

Figure 8:
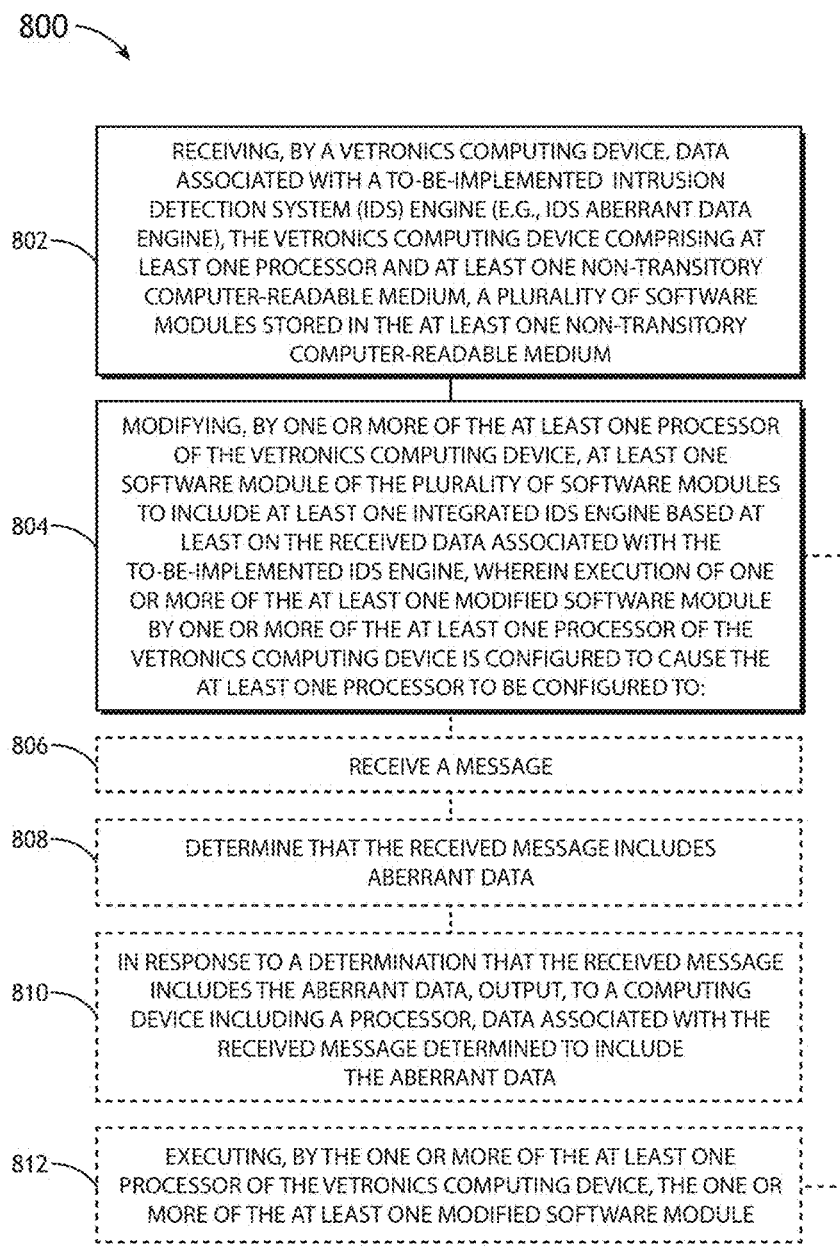
FIG. 8 is a diagram of an exemplary embodiment of a method according to the inventive concepts disclosed herein.

Referring now to FIG. 8, an exemplary embodiment of a method 800 according to the inventive concepts disclosed herein may include one or more of the following steps, which, for example, may be performed by at least one processor of a computing device (e.g., a vetronics computing device (e.g., an avionics computing device, such as 112-1, 112-2, 112-3, 112-4, 112-5, 112-6, 112-7)). For example, the method 800 may be a method for improving the functioning of a vetronics computing device (e.g., an avionics computing device (e.g., 112-1, 112-2, 112-3, 112-4, 112-5, 112-6, 112-7), itself, such as by upgrading a standard or existing computing device to improve the functioning of the vetronics computing device, itself. Performance of the method 800 may improve the functioning of the computing device, itself, for example, by increasing the expected useful life of the computing device, increasing available processing resources, increasing available processing resources, increasing available on-device networking resources, reducing power consumed by the computing device, itself, increasing available bandwidth for the computing device, itself, and/or reducing data flow congestion on networking components of the computing device, itself. Additionally, for example, some embodiments may include multiple computing devices 112 (e.g., avionics computing device, such as 112-2, 112-3, 112-4, 112-5, 112-6, 112-7) each performing one more instances of the method iteratively, concurrently, and/or sequentially.

A step 802 may include receiving, by a vetronics computing device, data associated with at least one to-be-implemented intrusion detection system (IDS) engine (e.g., IDS aberrant data engine), the vetronics computing device comprising at least one processor and at least one non-transitory computer-readable medium, a plurality of software modules stored in the at least one non-transitory computer-readable medium.

A step 804 may include modifying, by one or more of the at least one processor of the vetronics computing device, at least one software module of the plurality of software modules to include at least one integrated IDS aberrant data engine based at least on the at least one received data associated with the to-be-implemented IDS aberrant data engine, wherein execution of one or more of the at least one modified software module by one or more of the at least one processor of the vetronics computing device is configured to cause the at least one processor to be configured to: perform a step 806 of receiving a message; perform a step 808 of determining that the received message includes aberrant data; and/or perform a step 810 of in response to a determination that the received message includes the aberrant data, outputting, to a computing device including a processor, data associated with the received message determined to include the aberrant data.

A step 812 may include executing, by the one or more of the at least one processor of the vetronics computing device, the one or more of the at least one modified software module. The step 812 may include causing the at least one processor to be configured to: perform the step 806 of receiving a message; perform the step 808 of determining that the received message includes aberrant data; and/or perform the step 810 of in response to a determination that the received message includes the aberrant data, outputting, to a computing device including a processor, data associated with the received message determined to include the aberrant data.

Further, the method 800 may include any of the operations disclosed throughout.

As will be appreciated from the above, embodiments of the inventive concepts disclosed herein may be directed to a method, a system, and devices. Some embodiments may include an IDS that is distributed among multiple vehicular computing devices and/or other computing devices, which are communicatively coupled.

As used throughout and as would be appreciated by those skilled in the art, "at least one non-transitory computer-readable medium" may refer to as at least one non-transitory computer-readable medium (e.g., memory 110, memory 116, memory 212, memory 116-1, storage 118, storage 214, storage 118-1, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A computing device, comprising:
   at least one non-transitory computer-readable medium; and
   at least one processor communicatively coupled to the at least one non-transitory computer-readable medium, the at least one processor configured to:
      receive, from at least one vetronics computing device, data associated with one or more messages received by the at least one vetronics computing device, the one or more messages having been determined to include aberrant data, the one or more messages having been determined to at least one of include invalid health data or lack valid health data, the one or more messages having been determined to include the aberrant data based at least on the determination that the received message at least one of includes the invalid health data or lacks the valid health data, each of the at least one vetronics computing device including a vetronics computing device processor;
      based at least on the received data, determine an occurrence of a cyber security threat; and
      output cyber security threat data associated with the determined occurrence of the cyber security threat.

2. The computing device of claim 1, wherein the at least one processor is further configured to:
   based at least on the received data, determine an occurrence of a cyber security threat at least with respect to the vetronics computing device.

3. The computing device of claim 1, wherein the at least one processor is further configured to:
   analyze the received data associated with the one or more messages that include the aberrant data; and
   filter out false positive data from the received data, the false positive data indicative of at least one false positive cyber security threat.

4. The computing device of claim 3, wherein the at least one processor is further configured to:
   output at least a portion of the filtered received data to another computing device including a computing device processor or to an input/output device.

5. The computing device of claim 1, wherein each of the at least one vetronics computing device is an avionics computing device and wherein the vetronics computing device processor of each of the at least one vetronics computing device is an avionics computing device processor.

6. The computing device of claim 1, wherein the at least one non-transitory computer-readable medium is configured to store a plurality of software modules including at least one modified software module, one or more of the at least one modified software module including at least one integrated intrusion detection system (IDS) engine, wherein execution of at least one of the one or more of the at least one modified software module by one or more of the at least one processor is configured to cause the at least one processor to be configured at least to:
   based at least on the received data, determine the occurrence of the cyber security threat; and
   output the cyber security threat data associated with the determined occurrence of the cyber security threat.

7. The computing device of claim 6, wherein each of the at least one modified software module is a modified existing or standard vetronics software module, each modified existing or standard vetronics software module having been modified to include the at least one integrated IDS engine.

8. A system, comprising:
   a plurality of vetronics computing devices implemented in a vehicle, each of the plurality of vetronics computing devices comprising:
      at least one non-transitory computer-readable medium; and
      at least one processor communicatively coupled to the at least one non-transitory computer-readable medium, the at least one processor configured to:
         receive messages;
         determine that one or more of the received messages include aberrant data;
         determine that the received message at least one of includes invalid health data or lacks valid health data; and
         determine that the received message includes the aberrant data based at least on the determination that the received message at least one of includes the invalid health data or lacks the valid health data; and
         in response to a determination that the one or more received messages include the aberrant data, output data associated with the one or more received messages determined to include the aberrant data; and
   a computing device communicatively coupled to the plurality of vetronics computing devices, the computing device comprising:
      at least one computing device non-transitory computer-readable medium; and
      at least one computing device processor communicatively coupled to the at least one computing device non-transitory computer-readable medium, the at least one computing device processor configured to:
         receive outputted data associated with the one or more received messages determined to include the aberrant data;
         based at least on the received outputted data, determine an occurrence of a cyber security threat; and
         output cyber security threat data associated with the determined occurrence of the cyber security threat.

9. The system of claim 8, wherein the vehicle is an aircraft and the plurality of vetronics computing devices is a plurality of avionics computing devices implemented in the aircraft, wherein at least one of the plurality of avionics computing devices is an engine indication and crew alerting system (EICAS) computing device, a flight management system (FMS) computing device, an integrated flight information system (IFIS) computing device, an information management system (IMS) computing device, an onboard maintenance system (OMS) computing device, or a terrain awareness and warning system (TAWS) computing device.

10. The system of claim 8, wherein the vehicle is an aircraft and the plurality of vetronics computing devices is a plurality of avionics computing devices implemented in the aircraft, wherein the computing device is implemented in the aircraft.

11. The system of claim 10, wherein the computing device is an onboard maintenance system (OMS) computing device implemented in the aircraft.

12. A vetronics computing device, comprising:
at least one non-transitory computer-readable medium; and
at least one processor communicatively coupled to the at least one non-transitory computer-readable medium, the at least one processor configured to:
receive a message;
determine that the received message includes aberrant data;
determine that the received message at least one of includes invalid health data or lacks valid health data; and
determine that the received message includes the aberrant data based at least on the determination that the received message at least one of includes the invalid health data or lacks the valid health data; and
in response to a determination that the received message includes the aberrant data, output, to a computing device including a processor, data associated with the received message determined to include the aberrant data.

13. The vetronics computing device of claim 12, wherein the at least one processor is further configured to:
determine that the received message includes incorrect parity; and
determine that the received message includes the aberrant data based at least on the determination that the received message includes the incorrect parity.

14. The vetronics computing device of claim 12, wherein the at least one processor is further configured to:
determine that the received message includes out-of-range sensor data; and
determine that the received message includes the aberrant data based at least on the determination that the received message includes the out-of-range sensor data.

15. The vetronics computing device of claim 12, wherein the at least one processor is further configured to:
determine that the received message includes differential out-of-range redundant sensor data; and
determine that the received message includes the aberrant data based at least on the determination that the received message includes the differential out-of-range redundant sensor data.

16. The vetronics computing device of claim 12, wherein the at least one processor is further configured to:
determine that the received message includes an invalid pad bit; and
determine that the received message includes the aberrant data based at least on the determination that the received message includes the invalid pad bit.

17. The vetronics computing device of claim 12, wherein the at least one processor is further configured to:
determine that the received message includes an invalid value; and
determine that the received message includes the aberrant data based at least on the determination that the received message includes the invalid value.

18. The vetronics computing device of claim 12, wherein the at least one processor is further configured to:
determine that the received message includes an invalid format; and
determine that the received message includes the aberrant data based at least on the determination that the received message includes the invalid format.

19. The vetronics computing device of claim 12, wherein the at least one processor is further configured to:
determine that the received message includes an invalid length; and
determine that the received message includes the aberrant data based at least on the determination that the received message includes the invalid length.

20. The vetronics computing device of claim 12, wherein the at least one processor is further configured to:
determine that the received message includes an invalid state; and
determine that the received message includes the aberrant data based at least on the determination that the received message includes the invalid state.

21. The vetronics computing device of claim 12, wherein the at least one processor is further configured to:
rate limit the data output to the computing device.

22. The vetronics computing device of claim 12, wherein the at least one non-transitory computer-readable medium is configured to store a plurality of software modules including at least one modified software module, one or more of the at least one modified software module including at least one integrated intrusion detection system (IDS) engine, wherein execution of at least one of the one or more of the at least one modified software module by one or more of the at least one processor is configured to cause the at least one processor to be configured at least to:
determine that the received message includes the aberrant data; and
in response to the determination that the received message includes the aberrant data, output the data associated with the received message determined to include the aberrant data.

* * * * *